(12) United States Patent
Jeck et al.

(10) Patent No.: US 7,609,196 B2
(45) Date of Patent: Oct. 27, 2009

(54) METHOD AND DEVICE FOR IMAGING TEST OBJECTS BY MEANS OF ELECTROMAGNETIC WAVES, IN PARTICULAR FOR INSPECTING INDIVIDUALS FOR SUSPICIOUS ITEMS

(75) Inventors: Michael Jeck, Mainz (DE); Frank Gumbmann, Oberreichenbach (DE); Lorenz-Peter Schmidt, Hessdorf (DE); Hue-Phat Tran, Erlangen (DE); Jochen Weinzierl, Nuremberg (DE)

(73) Assignee: Smiths Heimann GmbH, Wiesbaden (DE)

( * ) Notice: Subject to any disclaimer, the term of this patent is extended or adjusted under 35 U.S.C. 154(b) by 0 days.

(21) Appl. No.: 12/044,218

(22) Filed: Mar. 7, 2008

(65) Prior Publication Data
US 2008/0211713 A1 Sep. 4, 2008

Related U.S. Application Data

(63) Continuation of application No. PCT/EP2006/007906, filed on Aug. 10, 2006.

(30) Foreign Application Priority Data
Sep. 7, 2005 (DE) .................. 10 2005 042 463

(51) Int. Cl.
*G01S 13/90* (2006.01)
(52) U.S. Cl. ..................................... 342/25 A
(58) Field of Classification Search .......... 342/22, 342/25 A
See application file for complete search history.

(56) References Cited

U.S. PATENT DOCUMENTS

| | | | |
|---|---|---|---|
| 4,841,489 A | 6/1989 | Ozaki et al. | |
| 5,455,590 A | 10/1995 | Collins et al. | |
| 5,673,050 A | 9/1997 | Moussally et al. | |
| 5,859,609 A | 1/1999 | Sheen et al. | |
| 6,216,540 B1 * | 4/2001 | Nelson et al. | ................ 73/633 |
| 2003/0128169 A1 | 7/2003 | Desargant et al. | |

FOREIGN PATENT DOCUMENTS

| | | | |
|---|---|---|---|
| DE | 19757992 A1 | | 4/1999 |
| DE | 102005016106 A1 | | 10/2006 |
| EP | 0925517 B1 | | 6/1999 |

OTHER PUBLICATIONS

Wang et al., "Pulsed Terahertz tomography", Journal of Physics D: Applied Physics, vol. 37, No. 4, Feb. 2004, pp. 1-36.*
Huang et al., "Noninvasive study of explosive materials by time domain spectroscopy and FTIR", AIP Conference Proceedings, vol. 760, issue 1, Apr. 9, 2005, pp. 578-585.*

* cited by examiner

*Primary Examiner*—Ian J Lobo
(74) *Attorney, Agent, or Firm*—Muncy, Geissler, Olds & Lowe, PLLC

(57) ABSTRACT

A method for imaging test objects by means of electromagnetic waves, in particular for the purpose of checking individuals for suspicious articles, in which method the test object is illuminated by electromagnetic waves, the scattered waves are received and evaluated for an imaginal representation of the test object on the basis of the synthetic aperture principle (SAR). A synthetic aperture is produced by the waves output by an antenna being concentrated initially in spatial terms, the point of high concentration being moved on a reflector along a circle.

9 Claims, 3 Drawing Sheets

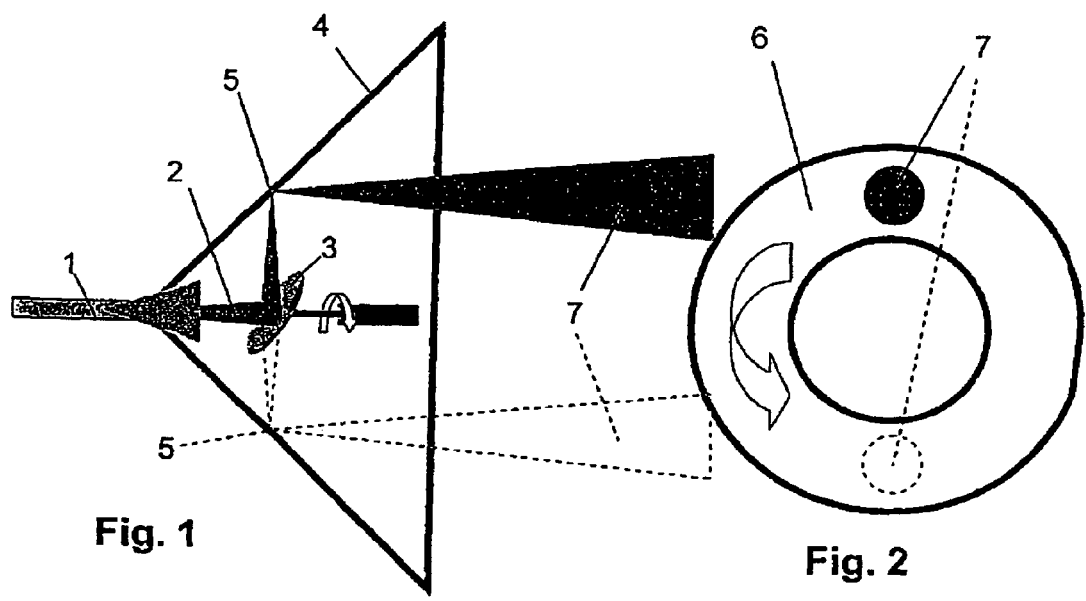
Fig. 1
Fig. 2
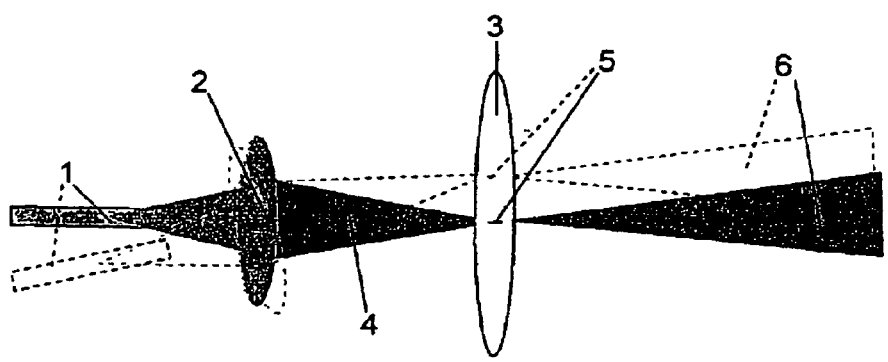
Fig. 3

METHOD AND DEVICE FOR IMAGING TEST OBJECTS BY MEANS OF ELECTROMAGNETIC WAVES, IN PARTICULAR FOR INSPECTING INDIVIDUALS FOR SUSPICIOUS ITEMS

This nonprovisional application is a continuation of International Application No. PCT/EP20061007906 which was filed on Aug. 10, 2006, and which claims priority to German Patent Application No. 10 2005 042 463.5, which was filed in Germany on Sep. 7, 2005, and which are both herein incorporated by reference.

BACKGROUND OF THE INVENTION

1. Field of the Invention

The invention relates to a method for imaging test objects by means of electromagnetic waves, in particular for inspecting individuals for suspicious items, in which the test object is illuminated with electromagnetic waves, and the scattered waves are received and analyzed using the synthetic aperture principle (SAR) to display an image of the test object.

2. Description of the Background Art

In order to inspect individuals or pieces of luggage (hereinafter referred to as test objects) for hidden dangerous items (weapons, explosives), methods are known in which the test objects (individuals, pieces of luggage) are scanned with millimeter waves in order to detect suspicious items. U.S. Pat. No. 5,859,609 describes such a method in which the individual to be inspected stands on a platform while being successively illuminated along his circumference with millimeter waves from a vertical antenna array. To this end, the antenna array travels in a circle around the individual and scans him circumferentially. Electrical signals are produced at a variety of predetermined positions in space from the waves reflected from the target, and a computer generates a holographic reconstruction of the target from these signals. Similar methods are described in U.S. Pat. No. 5,455,590 and EP-A 0925517.

German patent application 10 2005 016 106 describes a method of the generic type in which a test object is illuminated successively with millimeter waves along its circumference, and the scattered waves are received and analyzed to display an image of the test object, wherein the pulse radar or FMCW radar principle is used to analyze radiation scattered in the direction of the longitudinal axis of the test object and the SAR principle is used for analysis perpendicular to the longitudinal axis.

The prior art systems have a number of disadvantages, however. Devices that accomplish beam deflection by phase-shifted driving of an antenna array are very complex and expensive. Moreover, these systems are limited to certain frequency ranges by the geometry of the antenna array. In addition, the resolution and achievable depth information are not satisfactory for inspecting individuals for suspicious items.

SUMMARY OF THE INVENTION

It is therefore an object of the invention to provide a method for imaging test objects by electromagnetic waves that permit high resolution and can be implemented in a simple and economical manner.

This object is achieved in accordance with the invention in that a synthetic aperture is produced by first spatially concentrating the waves emitted by an antenna, wherein the location of high concentration is manipulated such that it serves as a moving virtual antenna for an SAR analysis.

The invention makes it possible to apply a two-dimensional SAR method that permits high resolution in both the X and Y directions. Through the use of movable, virtual antennas, the SAR method can be implemented without requiring complex antenna drivers.

The invention is explained in detail below with reference to various example embodiments. Transmission is described in each case. Since the beam path is reciprocal, the system operates in a corresponding manner in the receive case. The source and sink of the electromagnetic radiation may be in front of or behind the antenna. Transmit and receive signals are separated by appropriate components, for example by the means that the antenna is connected to a transmitting or receiving device through couplers, circulators, and/or an arrangement of reflector grids.

Likewise, instead of a single antenna, it is possible to use two antennas or antenna systems positioned close together spatially, each of which has a transmit or receive function. Then the antenna may be composed of at least one transmitting antenna and at least one spatially separated receiving antenna.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 shows a side view of an embodiment in which the antenna emits millimeter waves, which are reflected and focused at a rotating component, FIG. 2 shows a front view of the embodiment from FIG. 1.

DETAILED DESCRIPTION

Figure 3A:
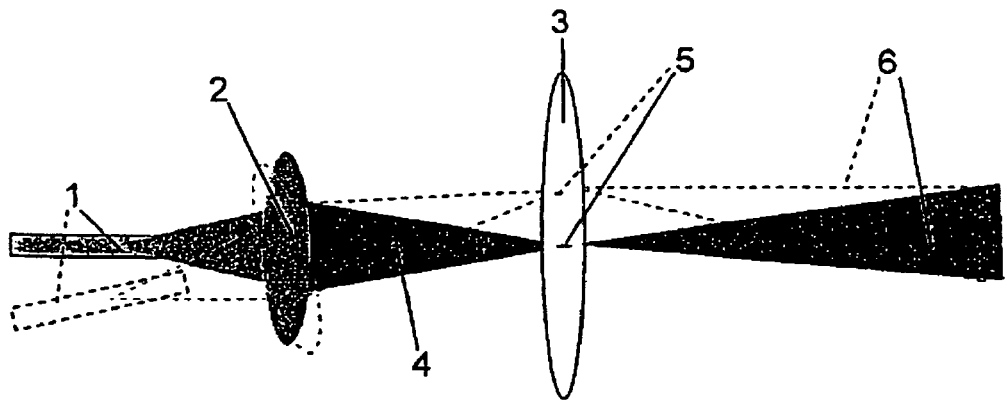
FIG. 3 shows an embodiment in which a rotatable antenna emits millimeter waves that are concentrated onto a quasi-optical element.

The systems shown in the figures are each part of, for example, a test unit used to inspect airline passengers at an airport. The test unit is used to check airline passengers for suspicious items such as weapons or explosive substances during check-in. The electromagnetic waves used for illuminating the test objects have a frequency between 1 GHz and 10 THz. Preferably, millimeter waves with a frequency between 30 GHz and 300 GHz are used. Either the transmitting antennas themselves, or separate receiving antennas, can be used to receive the reflected waves.

Preferably the test unit includes a platform upon which the test object, for example a passenger, is located while the inspection is being carried out. According to one embodiment, the transmitting and receiving systems rotate about the stationary test object in order to successively illuminate it along its circumference with millimeter waves. Alternatively, it is also possible to have the test object itself rotate on a platform before a stationary transmitting and receiving system.

In addition, the test unit includes an analysis system having suitable computing power, which uses the SAR principle to analyze the received waves scattered by the test object in order to obtain an image of the test object. The images produced are displayed to an operator on suitable display devices.

The embodiment shown in FIGS. 1 and 2 includes an antenna 1, which emits millimeter waves 2. The millimeter waves 2 strike a rotatable component 3, from which they are reflected and simultaneously concentrated. Preferably the element 3 is a rotating mirror, which deflects the beams towards a conical reflector 4 and concentrates them thereon, so that the point 5 of maximum concentration lies on the reflector 4 and is moved thereon along a circle. The reflector 4 is shaped such that, in cooperation with the rotating component 3, the surface 6 to be imaged is scanned in a circular fashion, as shown in FIG. 2.

The point 5 of greatest concentration, which is to say the reflection point on the reflector 4, is small enough in size that it can be treated as a virtual antenna that produces a cone of rays 7 in the far field with a large aperture angle. This large aperture angle is necessary for good resolution using SAR algorithms. The cone of rays 7 that is generated scans the test object under inspection in a circular manner. A second position of the cone of rays 7 on its circular path is indicated by dashed lines in FIGS. 1 and 2.

In addition, the transmitting and receiving system is moved horizontally (out of the plane of the drawing in FIG. 1) or vertically (upward and downward in FIG. 1), so that the test object is scanned in two dimensions overall. If the entire transmitting and receiving system is moved about the test object, then scanning from different viewpoints is also possible.

In the embodiment shown in FIG. 3, millimeter waves are emitted by a mechanically or electronically rotatable antenna 1, and these waves are concentrated onto a quasi-optical element 3 by a focusing element 2 that is connected to the antenna 1. As focusing element 2, it is possible to use a lens integrated in the antenna 1; such combination arrangements are known as "lens antennas." As quasi-optical element 3, it is possible to use a lens, a mirror, or another element that achieves the result that the incident millimeter wave radiation 4 is deflected into a diverging cone of rays 6 that is moved up and down in parallel when the antenna 1 is rotated. The point 5 of greatest concentration, which serves as a moving virtual antenna for an SAR analysis, moves within the quasi-optical element 3. The test object can be scanned in a linear fashion with the diverging cone of rays 6 that moves up and down in parallel. In this embodiment, too, the entire transmitting and receiving arrangement is moved horizontally in addition (out of the plane of the drawing in FIG. 3), so that the test object is scanned in two dimensions overall. In the event that the entire transmitting and receiving system is moved about the test object, scanning from different viewpoints is also possible.

Figure 4:
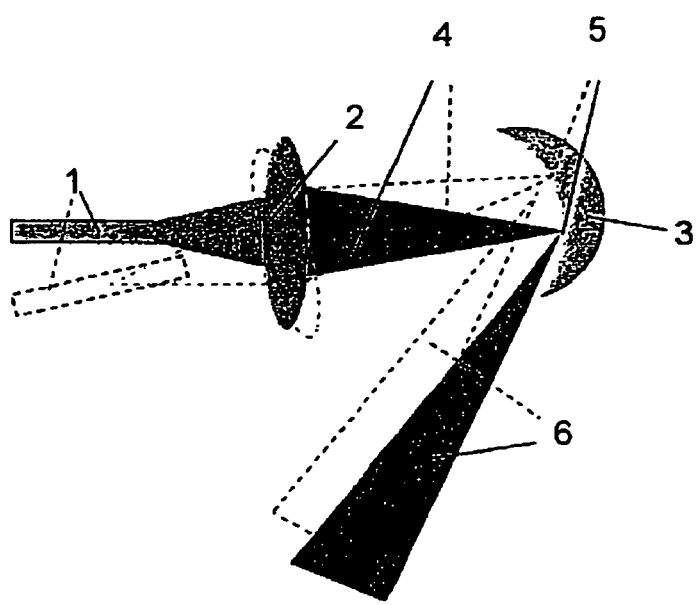
FIG. 4 shows another embodiment in which a rotatable antenna emits millimeter waves that are concentrated onto a reflective element.

Another embodiment is shown in FIG. 4. As in the embodiment from FIG. 3, a rotatable antenna 1 emits millimeter waves, which are concentrated onto a quasi-optical element 3 by a focusing element 2 that is connected to the antenna 1. In this embodiment, the quasi-optical element 3 is designed such that the incident millimeter wave radiation 4 is deflected into a diverging cone of rays 6. When the antenna 1 is rotated about the position shown in dashed lines, a parallel displacement of the diverging cone of rays 6 takes place to the position that is also shown in dashed lines. In this embodiment, the point 5 of greatest concentration, which can be considered a moving virtual antenna for the diverging cone of rays 6, moves on the surface of the reflective quasi-optical element 3.

In this embodiment, too, the entire transmitting and receiving device is moved horizontally (out of the plane of the drawing in FIG. 4). Thus, the test object is scanned in two dimensions overall. If the transmitting and receiving system is moved about the test object, then scanning from different viewpoints is possible here, as well.

Figure 5:
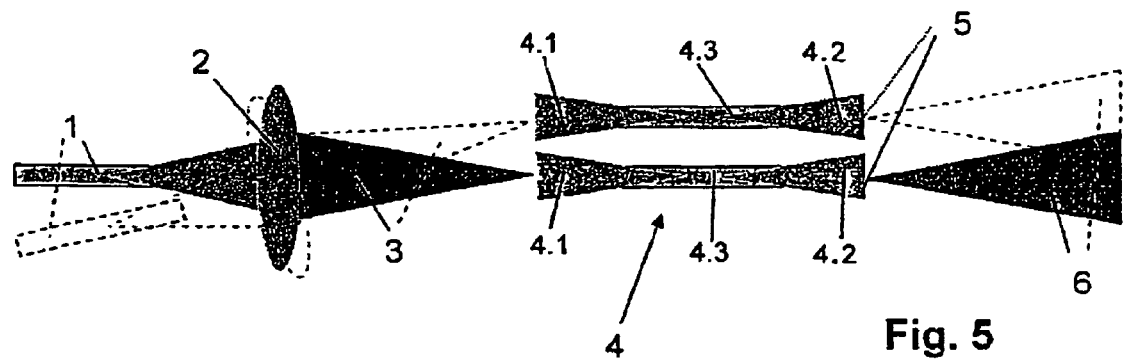
FIG. 5 shows another embodiment in which millimeter waves emitted by a rotatable antenna are concentrated sequentially onto various antenna-like elements.

Another possible embodiment of the invention is shown in FIG. 5. This embodiment also includes a mechanically or electronically rotatable antenna 1, which emits millimeter waves that are concentrated into a converging cone of rays 3 by a focusing element 2 connected to the antenna 1. Arranged next to one another behind the antenna 1 with the focusing element 2, are multiple elements 4, each of which consists of a receiving antenna 4.1, a transmitting antenna 4.2, and a line 4.3 connecting the receiving antenna 4.1 to the transmitting antenna 4.2. The elements 4 are arranged such that a converging cone of rays 3 strikes each receiving antenna 4.1. At its output side, each transmitting antenna 4.2 transmits a diverging cone of rays 6. The number of the elements 4 and their arrangement are chosen in this embodiment such that a certain spatial region is covered. When the antenna 1 is rotated, the converging cone of rays 3 strikes the various elements 4 sequentially, and thus sequentially produces parallel cones of rays 6 by which the test object is scanned. This embodiment has the advantage that it provides the possibility to arrange the transmitting antennas 4.2 of the elements 4 independently of their receiving antennas 4.1, since the connecting lines 4.3 can also be curved. This provides a very wide variety of options for using special arrangements of the transmitting antennas 4.2 to select the spatial region to be scanned. In this embodiment, the output of each transmitting antenna 4.2 of the element 4 constitutes the virtual antenna 5 for the diverging cone of rays 6.

In the embodiment from FIG. 5, as well, the entire arrangement including the elements 4 is moved horizontally (out of the plane of the drawing in FIG. 5). Thus, the test object is scanned in two dimensions. In this embodiment as well, movement of the entire arrangement about the test object permits scanning thereof from different viewpoints.

In place of the above-described production of parallel diverging cones of rays by the respective quasi-optical elements, the devices described can also be operated in the manner of a spotlight SAR. In this method the antenna is rotated in a tracking fashion such that the test object is illuminated longer. The quasi-optical element sequentially produces cones of rays whose angle of inclination changes. This method has the advantage that the virtual antenna aperture is enlarged.

Figure 6:
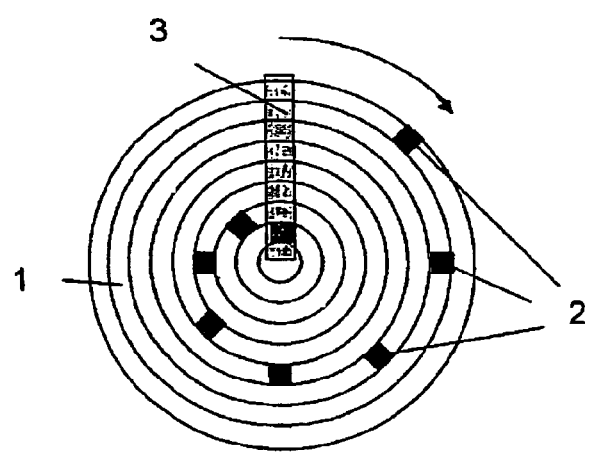
FIG. 6 shows an embodiment in which millimeter waves emitted by an antenna are focused onto a strip that is covered by a Nipkow disk, which sequentially allows the passage of radiation diverging at different points.

In the additional embodiment shown in FIG. 6, what is known as a Nipkow disk 1 is located behind the antenna, which is not shown. The disk 1 is mounted in rotatable fashion and contains holes 2, which are arranged on concentric circles having different diameters. The millimeter waves emitted by the antenna are focused on a strip 3, in front of which rotates the disk 1. Since millimeter waves are divergently radiated through the hole 2 at each passage of a hole 2 through the strip 3, the hole 2 located in the strip 3 in each case can be viewed as a virtual antenna for the diverging radiation. The virtual antenna travels along the strip 3, since the holes 2 sequentially pass through the strip 3 at different radii. Because of the rotary motions of the disk 1, a moving cone of rays is thus produced which linearly scans the test object being inspected. By means of an additional movement of the overall arrangement, such as is described for the embodiments in FIGS. 1 through 5, the test object can be scanned in two dimensions and also from different directions.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for imaging test objects or inspecting individuals for suspicious items by electromagnetic waves, comprising the steps of
    providing a synthetic aperture by first spatially concentrating electromagnetic waves emitted by an antenna to provide multiple locations of high concentration of said electromagnetic waves,
    manipulating at least one location of high concentration to provide a moving virtual antenna;
    illuminating a test object or individual with said moving virtual antenna of said electromagnetic waves; and
    receiving and analyzing scattered electromagnetic waves resulting from said illuminating step using synthetic aperture imaging (SAR) to display an image of the test object.

2. The method according to claim 1, wherein said electromagnetic waves comprise millimeter waves having a frequency between 1 GHz and 10 THz.

3. The method according to claim 1, wherein parallel diverging cones of rays are sequentially produced by a quasi-optical element through rotation of the antenna.

4. The method according to claim 1, wherein parallel diverging cones of rays with a changing angle of inclination are sequentially produced by a quasi-optical element through rotation of the antenna so that the cones of rays remain aimed at a substantially same point in space.

5. The method according to claim 1, wherein said electromagnetic waves comprise millimeter waves having a frequency between 30 GHz and 300 GHz.

6. The method according to claim 1, comprising projecting said electromagnetic waves emitted from said antenna onto a rotating component from which the waves are reflected and concentrated onto a reflector, wherein the reflector emits a moving, diverging cone of rays.

7. The method according to claim 1, wherein said antenna which emits said electromagnetic waves is a rotatable antenna, and said electromagnetic waves are projected onto a focusing element, from which focusing element said electromagnetic waves are concentrated onto a quasi-optical element, and wherein the quasi-optical element emits a diverging cone of rays that are displaced in parallel during rotational motion of the virtual antenna.

8. The method according to claim 1, wherein a virtual source is produced by a Nipkow disk, which covers a strip upon which the waves emitted by an antenna are focused.

9. The method according to claim 1, wherein at least one transmitting antenna and at least one spatially separated receiving antenna are used to provide a moving virtual antenna.

* * * * *

UNITED STATES PATENT AND TRADEMARK OFFICE
CERTIFICATE OF CORRECTION

PATENT NO. : 7,609,196 B2
APPLICATION NO. : 12/044218
DATED : October 27, 2009
INVENTOR(S) : Jeck et al.

It is certified that error appears in the above-identified patent and that said Letters Patent is hereby corrected as shown below:

On the title page item (75),

Change from:

Inventors: Jochen Weinzierl, Nuremberg (DE)

To:

Inventors: Jochen Weinzierl, Nuernberg (DE)

On the title page item (73),

Adding the 2<sup>nd</sup> Assignee:

Friedrich-Alexander-Universitaet Erlangen-Nuernberg, Erlangen (DE)

Signed and Sealed this

Seventh Day of September, 2010

David J. Kappos
*Director of the United States Patent and Trademark Office*